May 8, 1945. C. O. BARBRE 2,375,460
PROCESS FOR PURIFICATION OF SOLVENTS
Filed Dec. 26, 1941
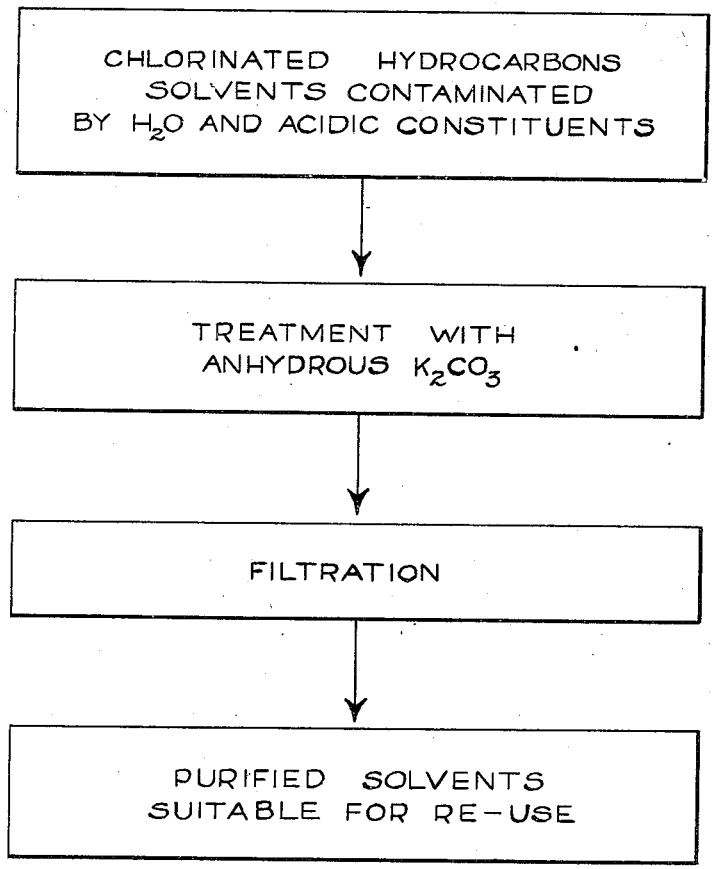
CHARLES O. BARBRE
INVENTOR
BY
ATTORNEYS Patented May 8, 1945

2,375,460

UNITED STATES PATENT OFFICE 2,375,460

PROCESS FOR PURIFICATION OF SOLVENTS

Charles O. Barbre, Binghamton, N. Y., assignor to General Aniline & Film Corporation, New York, N. Y., a corporation of Delaware Application December 26, 1941, Serial No. 424,469

2 Claims. (Cl. 106—310)

This invention pertains to a process for the purification of chlorinated hydrocarbon solvents and combinations thereof with alcohols, and particularly to a method of removing such impurities as water and acidic constituents from said solvents.

In the film manufacturing and lacquer industries, it is now quite customary to employ various chlorinated hydrocarbon solvents. In many cases, as in the manufacture of photographic film, these solvents are evaporated from the ultimate product, often in the presence of gas mixtures with insufficient oxygen for combustion. For reasons of economy it is desirable to recover these solvents and re-use them in the manufacture of additional materials. For such re-use it is often necessary that water and acidic constituents be removed to an extremely high degree. Because the boiling points of these solvents are extremely close together, and because the solvents may tend to form azeotropic mixtures in various proportions, it is unduly expensive to attempt to purify them by distillation. Certain other methods of purification not involving distillation have proven unsatisfactory since they fail to remove water and/or acidic constituents to a sufficient extent.

Water tends to favor some hydrolysis of the chlorinated solvents to acids, thereby increasing the problem of corrosion. I have found that certain dehydrating agents, such as calcium chloride, phosphorous pentoxide, and even sodium carbonate, are unsatisfactory, either because they fail to remove a high enough percentage of water and acidic constituents or because the treating agent contaminates the solvents, so that films made from such recovered solvents are unsatisfactory for photographic use.

With the foregoing defects of the prior art in view, it is accordingly one object of the present invention to provide an improved method for the purification of solvents without distillation.

A further object is the purification of chlorinated hydrocarbon solvents without distillation.

Still another object of the invention is the purification of mixtures of chlorinated hydrocarbons and of such hydrocarbons combined with one or more alcohols.

A still further object is to provide a method for the removal of water and acidic constituents from such solvents.

Other objects and advantages of the invention will be apparent from the following specification.

I have now found that the above objects are accomplished by treatment of the specified solvents with anhydrous potassium carbonate. The treatment may take place in normal manner, either by stirring the solvents in the presence of the potassium carbonate or by cascading the solvents continuously through a suitable tower or bed of the carbonate. As an additional precaution screening or filtration is often advantageous.

In the accompanying drawing forming a part of this application, the method of treatment is indicated schematically by a flow sheet showing certain steps in the process.

The results achieved according to the present invention are particularly surprising in view of the fact that such well-known purifying agents as sodium carbonate, calcium chloride, phosphorous pentoxide, activated carbon, and aluminum oxide were all found to be unsatisfactory for the present purpose.

As examples of typical chlorinated hydrocarbons which can be treated according to the invention may be mentioned methylene chloride, ethylene dichloride, chloroform, and propylene chloride. Also combinations of the above chlorinated hydrocarbons with alcohols such as butyl and amyl alcohol and their homologues, as described for example in United States Patent 2,169,537, Ossenbrunner at al., may be treated according to the present invention.

In order that those persons skilled in the art may fully understand and appreciate the nature and scope of this invention, reference is made to the following typical examples showing the use of the novel purification methods.

Example 1

Methylene chloride, contaminated by water to the extent of 0.21% by weight, was treated for twenty minutes with anhydrous potassium carbonate in the approximate proportion of 10 parts by weight of solvent to 1 part of the carbonate. The water content was reduced to 0.06%, and the treated solvent was of sufficient purity for further use in the manufacture of photographic film base.

Example 2

Ethylene dichloride, contaminated by water to the extent of 0.21% by weight, was treated for twenty minutes with anhydrous potassium carbonate in the approximate proportion of 10 parts by weight of solvent to 1 part of the carbonate. The water content was reduced to 0.06%, and the treated solvent was of sufficient purity for further use in the manufacture of photographic film base.

*Example 3*

A solvent mixture comprising methylene chloride, 3 parts, chloroform, 1 part, and including butanol up to 8% by weight, was treated with anhydrous potassium carbonate in a glass-lined tank. The original solvents included approximately 0.42% water. Approximately 2300 lbs. of solvents were stirred with 46 lbs. of the carbonate. After one half hour the water content of the solvent mixture was reduced to 0.19%. The acidity was reduced from that requiring 25 cc. of one hundredth normal sodium hydroxide for 100 cc. of solvents to an acidity requiring less than 1 cc., after one half hour. The solvents were then filtered. The non-volatile matter showed no increase over the minute amount in the original pure solvents as purchased. Such treated solvents completely met the rigid requirements for use in making photographic film base.

*Example 4*

A solvent mixture of the same composition as in Example 3 condensed from the continuous casting of photographic film base was treated over an extended period by passing over a bed of potassium carbonate, in an apparatus with suitable baffles and overflow for any entrained water. The water content before treatment averaged 0.4% by weight and the solvents had an acidity requiring 17 cc. of one hundredth normal sodium hydroxide per 100 cc. of solvents, for neutralization using phenolphthalein as an indicator. After treatment these figures were reduced to 0.1% and less than 1 cc. respectively. The solvents were then filtered. One pound of potassium carbonate was used for every 160 pounds of solvent. The non-volatile matter showed no increase over the minute amount in the original pure solvents as purchased. Such treated solvents completely met the rigid requirements for use in making photographic film base.

According to my experience, satisfactory results can be obtained in a continuous cyclic recovery process when using approximately 1 lb. of potassium carbonate for every 160 lbs. of solvent treated, where the original impurities do not exceed 0.7% of the treated solvents. These proportions may, of course, vary in a given case, depending on the extent to which impurities are present in the mixture to be purified and also depending on the degree of purification which is necessary for a given application. In any event, it is clear that a few simple experiments will enable the user to determine the optimum amount of solvents to be treated per pound of anhydrous potassium carbonate.

Furthermore, it should be noted that the present process may be combined as a final step after other purifying methods are applied. Thus, if the impurities are present in substantially higher amounts, other methods of physical or chemical separation may first be applied. Then the present process would be used to obtain the high degree of purification required for a particular purpose, such as in the manufacture of photographic film base from the purified solvents.

Now therefore I claim:

1. A process for the purification of a solvent mixture of at least one chlorinated hydrocarbon and an aliphatic alcohol used with photographic film and lacquer base materials, contaminated by water and acidic constituents, which comprises the step of treating said solvents with anhydrous potassium carbonate.

2. A process for purification of a solvent mixture consisting of up to 40% of a higher homologue of ethyl alcohol, said homologue containing in its molecule no more than 5 carbon atoms, methylene chloride and a chlorinated hydrocarbon boiling higher than methylene chloride but lower than the alcohol, such solvent mixture being capable of use for casting clear photographic film base of cellulose acetate and other cellulose derivatives, said solvents being contaminated by water and acidic constituents, which comprises the step of treating said solvent mixture with anhydrous potassium carbonate.

CHARLES O. BARBRE.